United States Patent
Jerrold-Jones et al.

(10) Patent No.: US 6,181,910 B1
(45) Date of Patent: Jan. 30, 2001

(54) PORTABLE AUTOMATED TEST SCORING SYSTEM AND METHOD

(76) Inventors: David A. Jerrold-Jones, 17 Albergar, San Clemente, CA (US) 92672; Robert S. Biedermann, 28085 Paseo Verde, San Juan Capistrano, CA (US) 92675

( * ) Notice: Under 35 U.S.C. 154(b), the term of this patent shall be extended for 0 days.

(21) Appl. No.: 09/146,624

(22) Filed: Sep. 3, 1998

(51) Int. Cl.⁷ .................... G09B 3/00; G09B 7/00
(52) U.S. Cl. .................. 434/353; 434/351; 434/362
(58) Field of Search ............................ 434/322, 323, 434/325, 327, 331, 335, 339, 344, 346, 350, 351, 353, 354, 355, 358, 362, 118

(56) References Cited

U.S. PATENT DOCUMENTS

| | | |
|---|---|---|
| 4,764,120 | 8/1988 | Griffin et al. ............... 434/336 |
| 5,161,118 | 11/1992 | Matsuda et al. ............. 708/542 |
| 5,379,213 | 1/1995 | Derks ............................ 434/350 |
| 5,513,994 | 5/1996 | Kershaw et al. ............. 434/350 |
| 5,586,889 | 12/1996 | Goodman ..................... 434/327 |
| 5,618,182 | 4/1997 | Thomas ........................ 434/323 |
| 5,640,152 | 6/1997 | Copper ....................... 340/825.54 |
| 5,704,029 | * 12/1997 | Wright, Jr. ................... 707/505 |
| 5,724,357 | * 3/1998 | Derks ........................... 370/313 |
| 5,769,643 | * 6/1998 | Stevens, III ................. 434/350 |
| 5,823,788 | 10/1998 | Lemelson et al. ........... 434/350 |
| 5,842,871 | 12/1998 | Cutler et al. ................. 434/335 |

\* cited by examiner

*Primary Examiner*—John Edmund Rovnak
(74) *Attorney, Agent, or Firm*—Stout, Uxa, Buyan & Mullins, LLP; Donald E. Stout

(57) ABSTRACT

There is provided an examination scoring system which comprises an independent, portable hand-held remote scoring unit (preferably owned by the student) having the capability to download answers stored therein without the need for an expensive docking station, and having the capability to transmit answers to the central scoring computer without the presence or assistance of the instructor or proctor. The system is particularly advantageous in that it provides the opportunity for the student to receive immediate scoring results to his or her remote scoring unit, and the remote scoring unit is designed to minimize the possibility of cheating.

14 Claims, 5 Drawing Sheets

PORTABLE AUTOMATED TEST SCORING SYSTEM AND METHOD

BACKGROUND OF THE INVENTION

This invention relates to a system for scoring test papers in an educational environment, and more particularly to a portable computerized test scoring system and method which permits each student to automatically download his or her answers to true/false or multiple choice examination questions from a remote unit to a centralized scoring computer, whereupon the examination will be instantaneously graded and the results downloaded to the student's remote unit.

There is a thrust in industry, due to environmental concerns, to reduce the amount of paper consumed and wasted throughout the world. This creates a need to transfer as much information as possible using paperless systems. One area in which such an approach is important is in the educational market, wherein the number of test papers required by colleges and universities is very large. Additionally, there is a long-felt need for a modernized system of testing wherein a student may take the test in a manner which ensures accurate, reliable, and instantaneous scoring, to thereby provide immediate feedback concerning his or her progress and which will minimize the chance for errors in recording and transferring the answers between the student and the teacher. Moreover, methods of testing which reduce the opportunity for cheating to occur are always desirable.

An electronic test scoring system and method using a remote answer recording unit which is operated by the student is disclosed in U.S. Pat. No. 5,379,213 to Derks. In the disclosed system, a scoring processor is provided which is operated by the teacher. Additionally, a plurality of answer recording units are provided, for the students who are taking a particular examination. The student records his or her answers to each examination question, by stroking particular keys on the keypad of the answer recording unit assigned to that student, after which the answer recording unit is placed in proximity with a docking station. The teacher or proctor then strokes a scoring key associated with the scoring processor, which causes the scoring processor to produce a pulse which activates an antenna on the scoring processor. The signal from this antenna activates the answer recording unit to transmit the inputted answers for the examination questions to the scoring processor, whereupon the instructor or proctor engages a clear signal whereby the scoring processor transmits a clear signal to the answer recording unit, so that the answer recording unit clears its memory.

The problem with this prior art system is its extreme complexity, and consequent cost disadvantage, which renders it impractical for use by most students and schools operating on very limited budgets. The system, for example, employs complex specially tuned inductive antennas for transmitting data, as well as oscillators and amplifiers, which are expensive and require an expensive and complex docking station between the answer recording unit and the scoring processor. Furthermore, the prior art system does not provide immediate feedback to the student, by providing the examination results. Structurally, the system requires a physically substantial impervious wall for the answer recording unit, which increases cost and weight of the system. Additionally, the assistance of the instructor or proctor is mandatory in order to download the inputted answers from the answer recording unit to the scoring processor.

What is needed, therefore, is an automated paperless examination scoring system comprising remote scoring (answer recording) units which are relatively inexpensive, easy to use, permanently identified with a particular student, and which employ cheat-resistant displays, to minimize fraud. The system should also be operable to provide the student with instantaneous test results.

SUMMARY OF THE INVENTION

The present invention solves the problems outlined above by providing an examination scoring system which comprises an independent, portable hand-held remote scoring unit, which preferably is owned by the student, having the capability to download answers stored therein without the need for an expensive docking station, and having the capability to transmit answers to the central scoring computer without the presence or assistance of the instructor or proctor. The system is particularly advantageous in that it provides the opportunity for the student to receive immediate scoring results to his or her remote scoring unit, and the remote scoring unit is designed to minimize the possibility of cheating. Additionally, it is ideal for use by students who may have difficulties with writing or may have hand/eye coordination disabilities which make it difficult or impossible for them to take examinations using the state-of-the-art bubble system.

More particularly, there is provided an examination scoring system which comprises a central scoring computer, such as a state of the art notebook computer, a master database which is loaded onto the central scoring computer, wherein the database contains correct answers to each of a plurality of questions which are to appear on a particular examination. Also included in the system is a remote scoring unit, which comprises a housing, a keypad including a plurality of answer keys, an enter key, and a send key for transmitting inputted answers to the central scoring computer. The housing includes thereon an infrared data transmission and receiving port for communicating directly with the central scoring computer. Advantageously, this communication takes place without the use of a docking station. The system includes a display for displaying information to a user, preferably a student.

An advantageous feature of the present invention is that the display is adapted to eliminate viewing by anyone other than the user. It preferably comprises a TN liquid crystal display without back lighting, and has a very narrow viewing angle. Additionally, a bezel is disposed about the display, extending upwardly to prevent viewing of the display by anyone other than the user.

Another advantageous feature of the invention is the inclusion of a read-only memory unit which contains a permanent unique identification code for identifying the remote scoring unit.

In another aspect of the invention, a remote scoring unit for an examination scoring system is provided, wherein the remote scoring unit comprises a housing, a keypad including a plurality of answer keys, an enter key, and a send key for transmitting inputted answers to a central scoring computer. The housing includes thereon an infrared data transmission and receiving port for communicating directly with the central scoring computer, without the use of a docking station. A display is provided for displaying information to a user.

In still another aspect of the invention, a method of taking and scoring an examination is provided, comprising the steps of activating a remote scoring unit comprising a housing, a keypad, a data transmission and receiving port for communicating directly with a central scoring computer, and a display for displaying information to a user. In this method, the student enters answers to a plurality of examination questions into a memory unit of the remote scoring unity by depressing selected answer keys on the keypad responsive to each one of the questions. Then, the remote scoring unit is located a suitable distance (preferably 1 to 3 feet away) from the central scoring computer and a send button is depressed to transmit the answers to the central scoring computer. A unique identifier is transmitted to the central scoring computer as well. Ultimately, the results of the examination are immediately received from the central scoring computer and displayed on the display.

The invention, together with additional features and advantages thereof, may best be understood by reference to the following description taken in conjunction with the accompanying illustrative drawing.

BRIEF DESCRIPTION OF THE DRAWINGS

FIG. 2A is a schematic side view of the keypad portion of the remote testing unit system shown in FIG. 2;

DESCRIPTION OF THE PREFERRED EMBODIMENT

Figure 1:
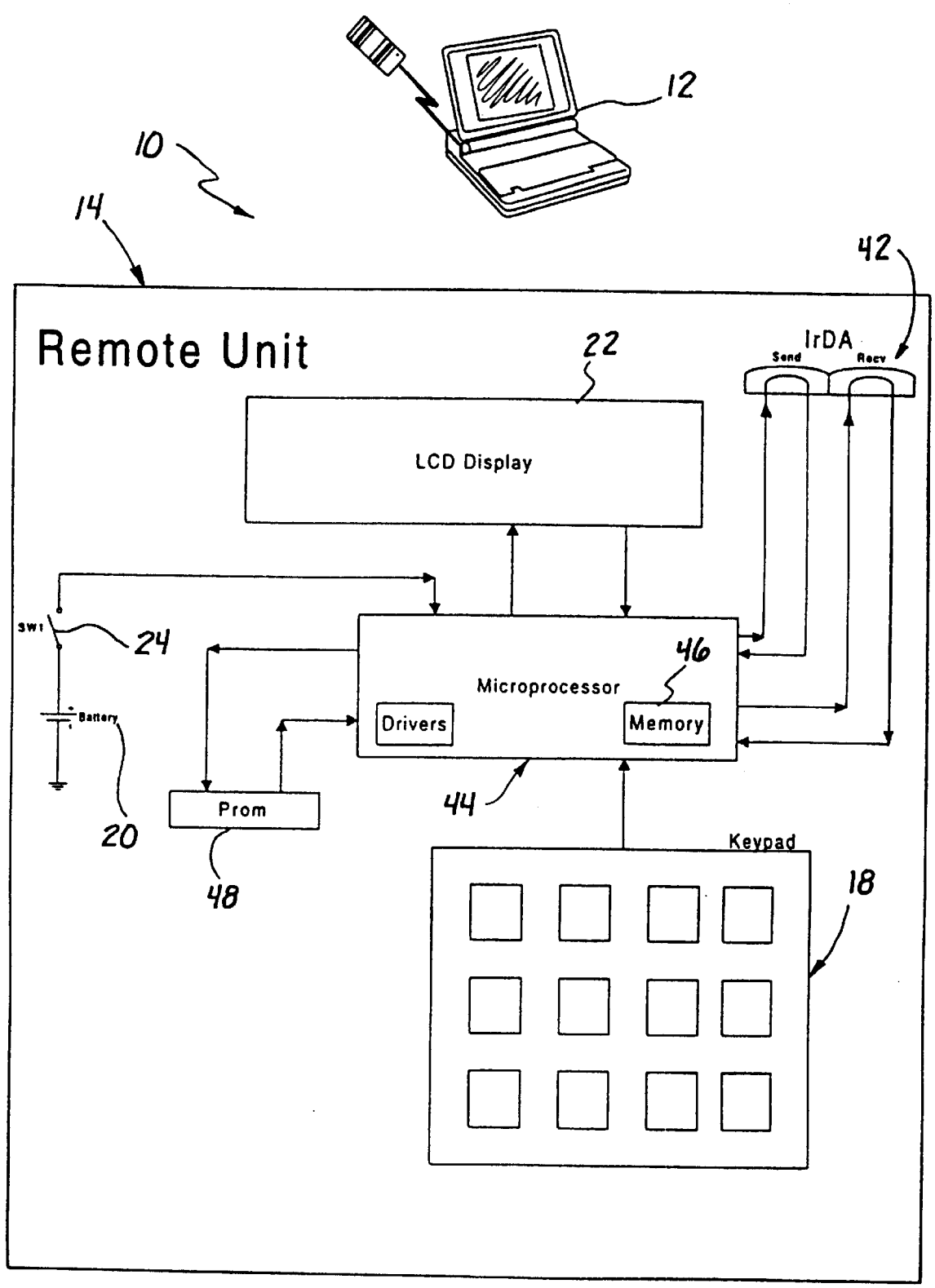
FIG. 1 is a schematic diagrammatic view of a remote testing unit system constructed in accordance with the principles of the present invention.
Figure 2:
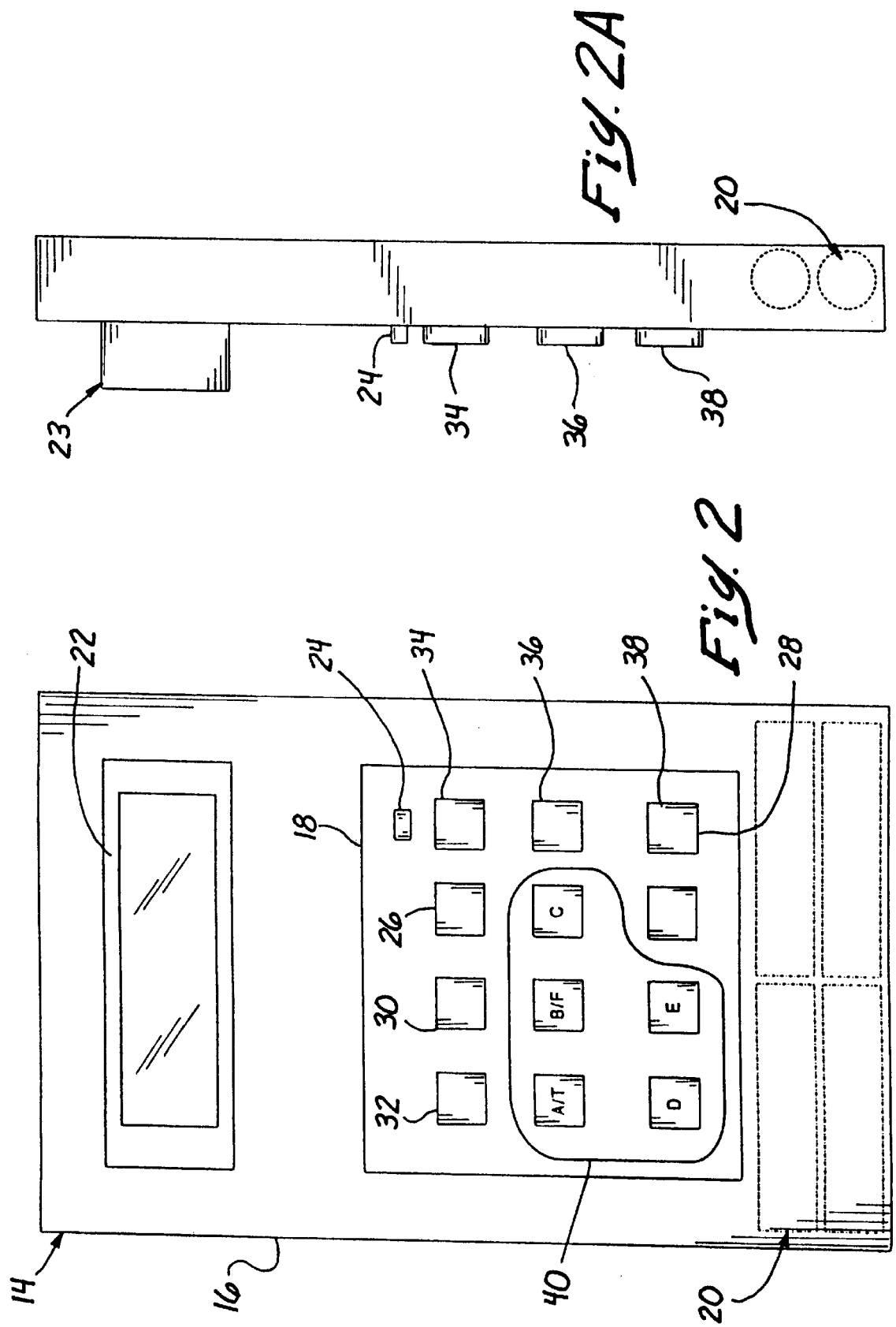
FIG. 2 is a schematic diagrammatic view of the keypad portion of the remote testing unit system illustrated in FIG. 1.

Referring now more particularly to FIGS. 1 and 2, there is provided a remote scoring system 10 (FIG. 1) constructed in accordance with the principles of the present invention, which comprises a central scoring computer 12 and a plurality of remote scoring units 14 (only one is shown in the drawings). The central scoring computer 12 is preferably a notebook or laptop computer of the current state of the art (at a minimum, having capabilities equivalent to those of a 100 MHz Pentium® microprocessor), though a desktop computer of equivalent capabilities may be used as well. A computer 12 of any format may be used (i.e. an IBM® compatible or MacIntosh® computer). As shown most clearly in FIG. 2, each remote scoring unit 14 comprises a housing 16, a keypad 18, batteries 20, and a display 22. The housing preferably is comprised of molded plastic, with an easily accessible battery compartment, and ideally is sized to be no larger than 7"×9"×2" and no smaller than 3"×4"×¼". In the preferred embodiment, the housing comprises four pieces, a lower case, a top cover, an IR lens, and a battery compartment cover. The battery compartment cover is the only piece that is to be operator removable. The molded housing material is preferably a flame retardant ABS plastic.

The display 22 is preferably a standard 16×1 line, dot matrix module, TN liquid crystal display, without back lighting, although other standard display formats may of course be utilized, and is designed to be "cheat-proof", in that it is adapted to be readable at a flat level by the user, but not by surrounding students at close proximity, in order to deter cheating. The TN has a very narrow viewing angle, and by not illuminating the display, cheating is further discouraged. As illustrated particularly in FIG. 2A, an extended "cheat-proof" bezel 23 is preferably provided about the display 22 in order to further ensure that the display may not easily be read by unauthorized individuals.

In the preferred embodiment, the keypad 18 comprises an on/off switch 24, a battery button or key 26, a "blank" button or key 28, and an "enter" button or key 30. Additionally, there are provided a "send" button or key 32, an "up" button or key 34, a "down" button or key 36, and a "change" button or key 38. A plurality of answer keys 40, preferably totaling five, are also included. The keypad 18 is preferably designed to comprise a custom 3×4 or 4×4 matrix rubber membrane, with keys having a positive tactile feel and of a convenient size and spaced sufficiently far apart so as not to mis-stroke a key. The rubber membrane preferably has a carbon dot that, when depressed onto the circuit below, makes a connection and sends a signal to the microprocessor. With particular reference now to FIG. 1, the remote unit 14 additionally comprises an infrared IrDA and/or I/O port 42 which communicates with a microprocessor 44 at a minimum transfer rate of 9600 Baud.

The printed circuit board of the remote unit 14 preferably has the components on one side and the traces for the keyboard on the other. The board itself consists of the single chip microprocessor 44 with drivers 45, memory 46, and a preprogrammed read-only memory unit or PROM 48 disposed thereon. The PROM 48 holds a unique unit identification number, erasing, and other instructions. The infrared transmitter/receiver port 42 is also disposed on the printed circuit board.

Figure 3:
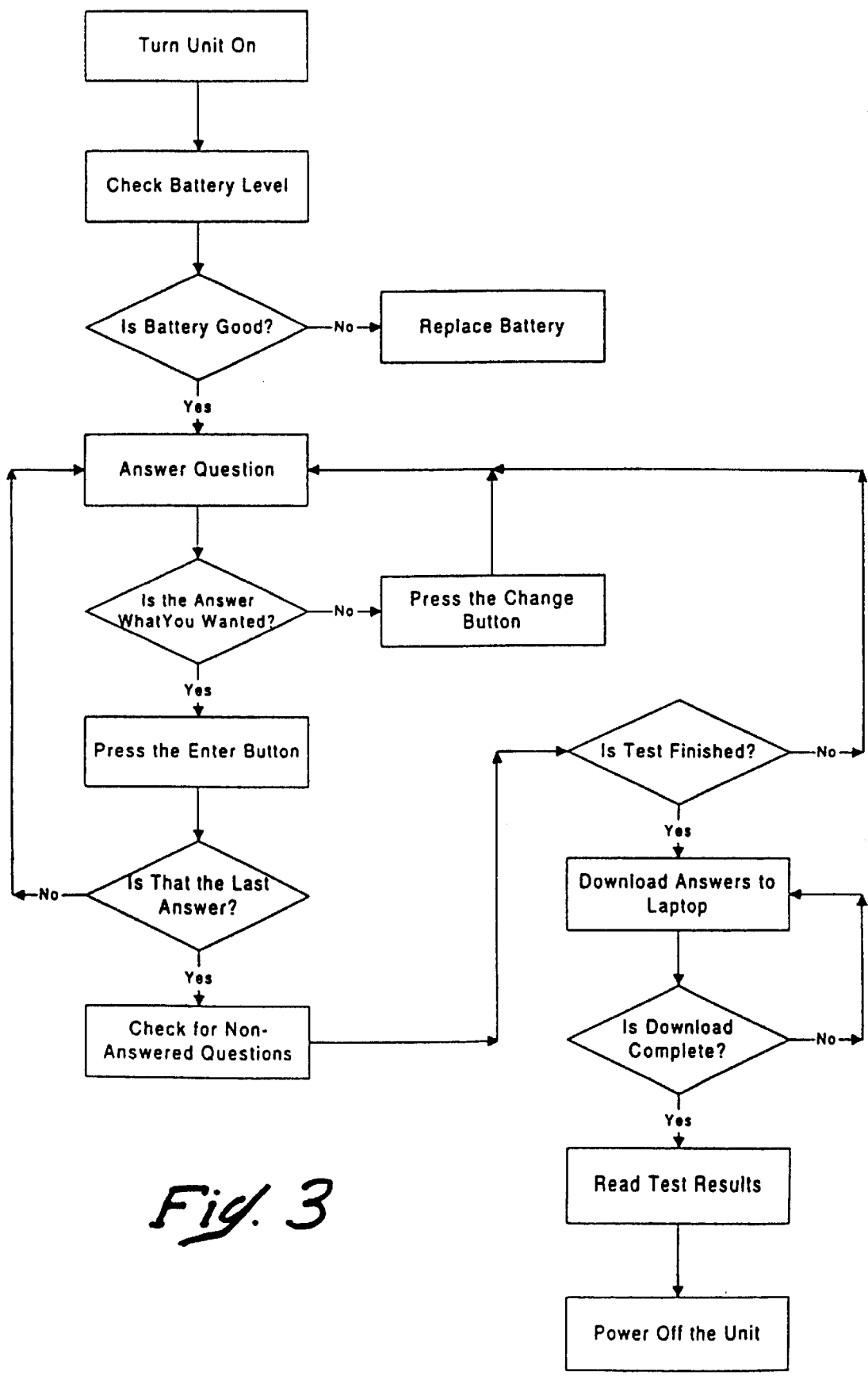
FIG. 3 is a schematic diagram illustrating a logic flow sequence for operation of the inventive remote testing unit.
Figure 4:
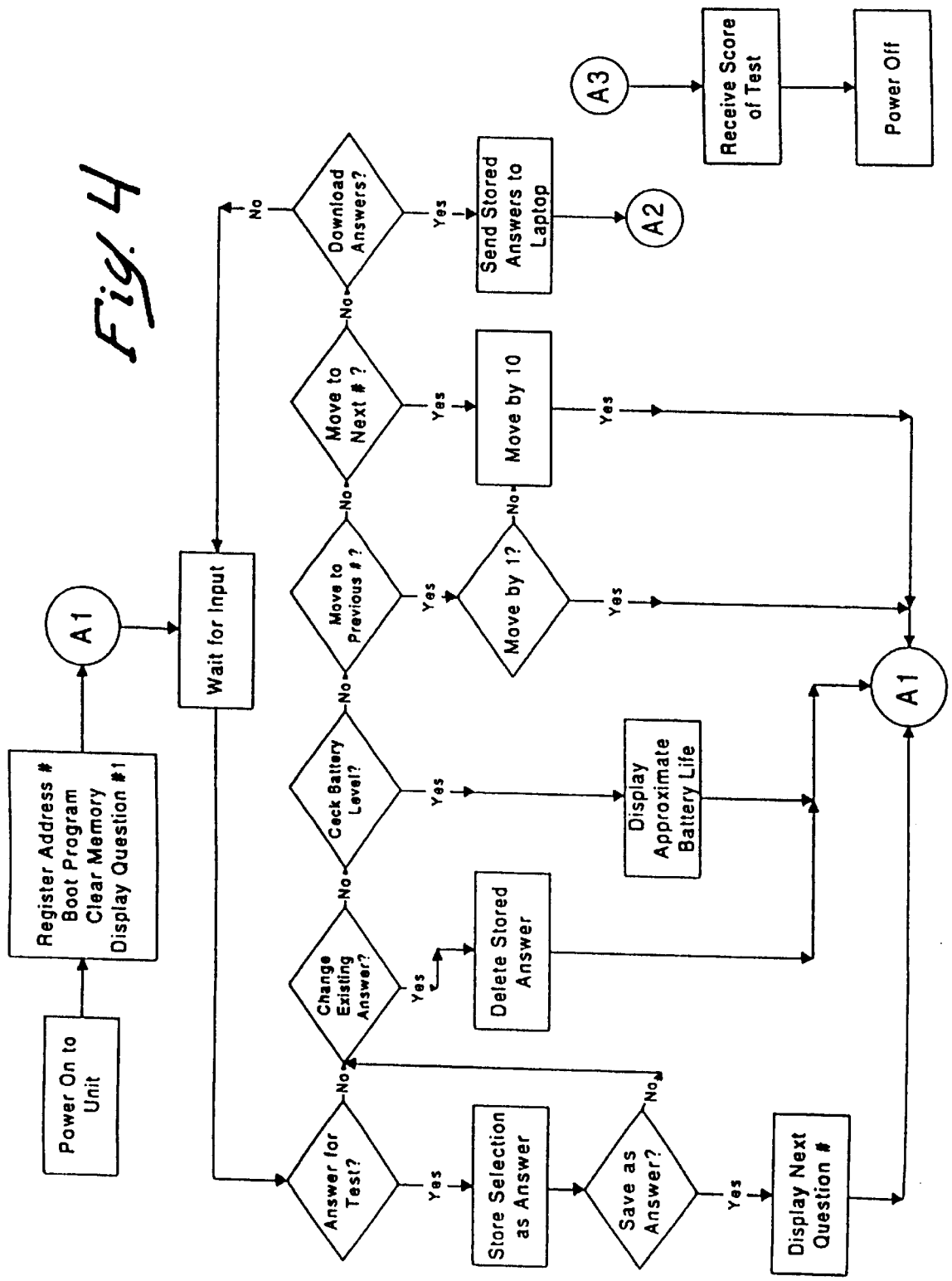
FIG. 4 is a schematic diagram illustrating a logic flow sequence for operation of the remote unit of the inventive testing system.

In operation, the instructor will create a test or quiz with multiple-choice or true and false questions, and will create a master answer file in the "Master Database" loaded onto the central scoring computer 12, which will comprise the master to be compared to by all examinees. At the time of the exam, each student (operator) will activate his or her remote scoring unit 14 using the on/off switch 24, which preferably comprises an alternate action switch, which will then sequence through a self-test procedure in which any information stored in the units memory 46 (FIG. 1) could be erased. An operator logic flow diagram is illustrated in FIG. 3., and the remote function logic flow diagram is illustrated in FIG. 4. The unit 14 will also proceed with a battery level check and reveal the results on the display 22 for approximately five seconds, in order to ensure that the operator has an opportunity to ensure that the batteries are fresh enough to endure through the expected length of the examination. Preferably, the unit 14 utilizes non-rechargeable batteries of a common size (i.e. AA size), but the unit could be designed to use rechargeable batteries, and/or to optionally operate using a power pack or recharging unit if desired. With fresh batteries, the remote unit 14 should be capable of at least twenty hours of continuous operation. Once the battery level check is completed, the display will prompt for an answer for examination question #1.

At this point, the operator has two options. If desired, the battery button 26 may be depressed to repeat the battery level check, which will again display the condition of the batteries 20. If the battery level is believed to be too low to finish the examination, the batteries 20 can be replaced at this time. It is not necessary to turn the remote unit off as it is preferably designed to hold all information in the units memory 46 without battery power, in order to ensure an opportunity to replace batteries during an examination without losing valuable information, if required.

The second option is to proceed with the examination. After reading the first question, the operator has one of several choices from which to select. For example, if the examination is multiple choice, the operator may depress one of the answer keys 40 which corresponds with the answer he believes is correct (i.e. A, B, C, D, or E). If it is true/false, the operator may depress either the answer key marked T, or the one marked F, depending upon the perceived correct response. The answer keys 40 may also be numerically designated (i.e. 1, 2, 3, 4, 5) to suit another testing format, or may be customized to the needs of a particular examination by the use of a keypad overlay (not shown), to designate the answer keys as required. Additional optional answer keys (not shown) may be provided as well, if desired to accommodate additional testing formats or a greater variety of answer possibilities. The unit is capable of storing the inputted answers to up to 300 examination questions during a single session.

If the operator is uncertain as to the correct answer for a particular question, the "blank" button 28 may be depressed to "hold" a place for the answer to be selected at an appropriate later time. Whatever button(s) has been depressed, that choice will be shown in the display 22. If the operator agrees that the displayed choice is the desired one, he will depress the "enter" button 30 to save the selection in the units memory 46, after which the display 22 will prompt for an answer to the next question. If the viewed display does not show the desired selection, the "change" button 38 should be depressed, whereupon the display will prompt for re-entry of the correct response to the same question.

If at any time during the examination, there is a long period of non-operation, the unit will power down to conserve battery time. Pressing any key at this time will "wake up" the unit and normal operations may proceed. When the final question is answered, or at any time during the course of the examination, the operator has the option to go back and review his answers or locate the questions answered with "blank", and to change those answers by making another selection. By selecting the "up" key 34 or the "down" key 36, the operator may move to any answer location desired by increments of 1. If the "up" or "down" key is held down, the display 22 will scroll through the answers, stopping on all blank locations to be answered.

Figure 5:
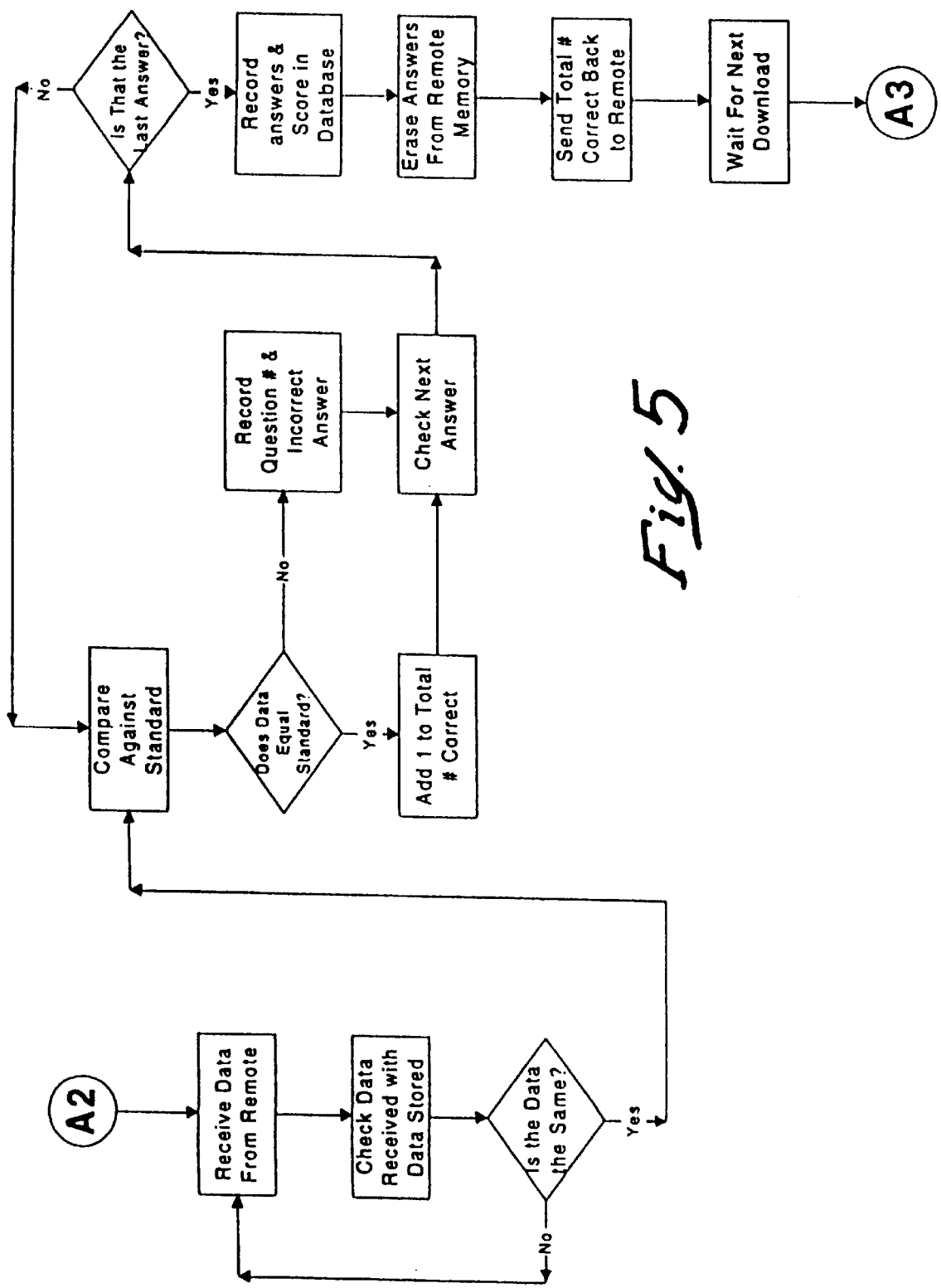
FIG. 5 is a schematic diagram illustrating a logic flow sequence for the central scoring unit of the inventive testing system.

When the operator is satisfied with all of his answer selections, or time has expired for completing the examination, he transports the remote unit 14 to a position 1 to 3 feet from the instructor's central scoring computer 12, so that the infrared port 42 is disposed adjacent to a similar infrared port on the central scoring computer 12. At this time, the "send" button 32 is depressed, whereupon the computer 12 will retrieve the remote unit's unique identification number, linked to the operator's name and/or school identification number, which is burned into the remote unit's PROM 48, together with the answer information stored in the memory 46, through the infrared transmitter/receiver port 42. The central scoring computer logic flow diagram is illustrated in FIG. 5.

Once the answer scoring and identification information has been received by the central scoring computer 12, the computer 12 will record and verify the information and its accuracy using loop-back checks. When verified as to the accuracy of the information, the computer 12 will compare the information received from the remote unit 14 against the master database, and record the results in a spreadsheet type database previously set up by the instructor. The computer 12, through the infrared transmitter and receiver port 42, will then erase the information in the memory 46 of the remote unit 14, leaving no chance that the answers can be saved and/or passed on to other examinees. However, the results of the examination will be sent back to the display 22 of the remote unit 14 with the number of correct answers indicated against the total number of possible correct answers for the examination, in order to provide instant scoring feedback to the operator. At this juncture, the remote unit 14 may be turned off at the on/off switch 24.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An examination scoring system, comprising:
   a central scoring computer;
   a master database loaded onto said central scoring computer, said database containing correct answers to each of a plurality of questions which are to appear on a particular examination; and
   a remote scoring unit, said remote scoring unit comprising:
   a housing;
   a keypad including a plurality of answer keys, an enter key, a send key for transmitting inputted answers to said central scoring computer, and a "blank" key for holding an answer to a particular question until a later time;
   a data transmission and receiving port for communicating directly with said central scoring computer, without the use of a docking station; and
   a display for displaying information to a user, said display comprising a bezel disposed thereabout, which extends upwardly a substantial distance in order to prevent viewing by anyone other than said user.

2. The examination scoring system as recited in claim 1, wherein said display comprises a TN liquid crystal display without back lighting, and has a very narrow viewing angle.

3. The examination scoring system as recited in claim 1, wherein said remote scoring unit further comprises a read-only memory unit which contains a permanent unique identification code for identifying said remote scoring unit.

4. The examination scoring system as recited in claim 1, wherein said transmission key may be activated to download inputted answers from said remote scoring unit to said central scoring computer.

5. The examination scoring system as recited in claim 1, wherein said keypad further comprises a "change" key for changing an inputted answer.

6. The examination scoring system as recited in claim 1, wherein said keypad further comprises a battery key for checking battery charge at any time.

7. An examination scoring system, comprising:
   a central scoring computer;
   a master database loaded onto said central scoring computer, said database containing correct answers to each of a plurality of questions which are to appear on a particular examination; and
   a remote scoring unit, said remote scoring unit comprising:

a housing;

a keypad including a plurality of answer keys, an enter key, a send key for transmitting inputted answers to said central scoring computer and a "blank" key for holding an answer to a particular question until a later time;

a data transmission and receiving port for communicating directly with said central scoring computer, without the use of a docking station; and a display for displaying information to a user;

said central scoring computer having a capability to transmit to only one remote scoring unit at a time, and said remote scoring unit having no capability to receive any transmitted information other than scoring information.

8. The examination scoring system as recited in claim 7, wherein said display comprises a TN liquid crystal display without back lighting, and has a very narrow viewing angle, in order to prevent viewing of the display by anyone other than said user.

9. The examination scoring system as recited in claim 7, and further comprising a bezel disposed about said display, said bezel extending upwardly to prevent viewing of the display by anyone other than said user.

10. The examination scoring system as recited in claim 7, wherein said remote scoring unit further comprises a read-only memory unit which contains a permanent unique identification code for identifying said remote scoring unit.

11. The examination scoring system as recited in claim 7, wherein said keypad further comprises a "change" key for changing an inputted answer.

12. The examination scoring system as recited in claim 7, wherein said keypad further comprises a battery key for checking battery charge at any time.

13. A method of taking and scoring an examination, comprising the steps of:

a) activating a remote scoring unit comprising a housing, a keypad, a data transmission and receiving port for communicating directly with a central scoring computer, and a display for displaying information to a user;

b) entering answers to a plurality of examination questions into a memory unit of said remote scoring unit by depressing selected answer keys on said keypad responsive to each one of said questions;

c) locating said remote scoring unit a suitable distance from said central scoring computer;

d) depressing a send button to transmit said answers to said central scoring computer;

e) transmitting a unique identifier to said central scoring computer;

f) using the central scoring computer to erase the memory unit of said remote scoring unit;

g) receiving results of said examination from said central scoring computer into said remote scoring unit; and h) displaying said results on said remote scoring unit display.

14. The method as recited in claim 13, and further comprising a step of preparing a master database of correct answers to said examination questions and inputting said master database into said central scoring computer.

* * * * *